United States Patent
Blokker et al.

(10) Patent No.: US 9,133,046 B2
(45) Date of Patent: Sep. 15, 2015

(54) METHOD OF INHIBITING SCALE FORMATION AND DEPOSITION IN DESALINATION SYSTEMS

(75) Inventors: Peter Blokker, Heerhugowaard (NL); Jasbir S. Gill, Naperville, IL (US); Paloma López-Serrano, Delft (NL)

(73) Assignee: Nalco Company, Naperville, IL (US)

( * ) Notice: Subject to any disclaimer, the term of this patent is extended or adjusted under 35 U.S.C. 154(b) by 271 days.

(21) Appl. No.: 13/173,804

(22) Filed: Jun. 30, 2011

(65) Prior Publication Data

US 2011/0253628 A1    Oct. 20, 2011

Related U.S. Application Data

(63) Continuation of application No. 11/876,375, filed on Oct. 22, 2007, now abandoned.

(51) Int. Cl.
| | |
|---|---|
| C02F 5/14 | (2006.01) |
| C02F 5/12 | (2006.01) |
| C02F 103/08 | (2006.01) |
| C02F 1/44 | (2006.01) |

(52) U.S. Cl.
CPC ... C02F 5/14 (2013.01); C02F 5/12 (2013.01); C02F 1/441 (2013.01); C02F 1/447 (2013.01); C02F 2103/08 (2013.01)

(58) Field of Classification Search
CPC .......................................................... C02F 5/14
USPC ......................................................... 210/699
See application file for complete search history.

(56) References Cited

U.S. PATENT DOCUMENTS

| | | | |
|---|---|---|---|
| 3,389,173 A | | 6/1968 | Russell et al. |
| 3,810,834 A | * | 5/1974 | Jones et al. ..................... 210/698 |
| 3,928,196 A | | 12/1975 | Persinski et al. |
| 3,974,039 A | | 8/1976 | Frohner et al. |
| 4,200,500 A | * | 4/1980 | Desai ................................ 203/7 |
| 4,342,652 A | * | 8/1982 | Schiller et al. ................ 210/698 |
| 4,563,284 A | | 1/1986 | Amjad |
| 4,634,532 A | | 1/1987 | Logan et al. |
| 4,650,591 A | | 3/1987 | Boothe et al. |
| 4,693,829 A | | 9/1987 | Boffardi |
| 4,762,621 A | | 8/1988 | Masler, III et al. |
| 4,783,314 A | * | 11/1988 | Hoots et al. ........................ 422/3 |
| 4,784,774 A | | 11/1988 | Amjad et al. |
| 4,966,711 A | * | 10/1990 | Hoots et al. .................... 210/697 |
| 5,018,577 A | | 5/1991 | Pardue et al. |
| 5,023,000 A | * | 6/1991 | Kneller et al. ................. 210/697 |
| 5,078,879 A | | 1/1992 | Gill et al. |
| 5,085,794 A | * | 2/1992 | Kneller et al. ................ 252/181 |
| 5,128,045 A | | 7/1992 | Parsons et al. |
| 5,256,303 A | | 10/1993 | Zeiher et al. |
| 5,282,976 A | | 2/1994 | Yeung |
| 5,284,590 A | | 2/1994 | Kohlhofer et al. |
| 5,358,640 A | * | 10/1994 | Zeiher et al. ................... 210/639 |
| 5,858,240 A | | 1/1999 | Twardowski et al. |
| 5,874,026 A | | 2/1999 | Pilsits, Jr. et al. |
| 5,932,074 A | | 8/1999 | Hoiss |
| 5,986,030 A | | 11/1999 | Murray et al. |
| 6,190,556 B1 | | 2/2001 | Uhlinger |
| 6,344,531 B1 | | 2/2002 | Murray et al. |
| 6,508,936 B1 | | 1/2003 | Hassan |
| 6,572,789 B1 | * | 6/2003 | Yang et al. ............... 252/389.23 |
| 6,685,840 B2 | | 2/2004 | Hatch |
| 6,699,369 B1 | | 3/2004 | Hartman et al. |
| 6,966,213 B2 | | 11/2005 | Hoots et al. |
| 7,220,382 B2 | | 5/2007 | Godfrey et al. |
| 7,862,727 B2 | * | 1/2011 | Blandford et al. ............ 210/699 |
| 2008/0169243 A1 | | 7/2008 | Dave et al. |

FOREIGN PATENT DOCUMENTS

WO    00/58228    10/2000

OTHER PUBLICATIONS

Glossary of Basic Terms in Polymer Science, Pure and Appl Chem. vol. 68, No. 12, pp. 2287-2311, 1996.*
Product Information: BWA Water Additives Belgard® EV Antiscalant for Seawater Distillation Plants @ www.wateradditives.com , published prior to Jan. 11, 2007.
Product Information: BWA Water Additives Belgard® EVN Antiscalant for Seawater Distillation Plants @ www.wateradditives. com, published prior to Jan. 11, 2007.
Product Information: BWA Water Additives Flocon® 135 Antiscalant for Seawater Distillation Plants @ www.wateradditives.com, published prior to Jan. 11, 2007.
Product Information: BWA Water Additives Flocon® 260 Antiscalant for Seawater Distillation Plants @ www.wateradditives.com, published prior to Jan. 11, 2007.
Product Information: BASF—The Chemical Company Sokalan® PM10 (literature not available), 2004.
Product Information: BASF—The Chemical Company Sokalan® PM15 (literature not available), 2004.
González-Velasco, J. et al., "Kinectics of Isomerization of Maleic Acid Using Ammonium Bromide and Ammonium Peroxydisulfate as Catalyst", Ind. Eng. Chem. Res., 1991, pp. 2138-2143, 30, American Chemical Society.

* cited by examiner

*Primary Examiner* — Tony G Soohoo
*Assistant Examiner* — Peter Keyworth
(74) *Attorney, Agent, or Firm* — Leydig, Voit & Mayer, Ltd.

(57) ABSTRACT

This invention relates to an improved method of inhibiting corrosion and calcium sulfate and calcium carbonate scaling in thermal and membrane desalination processes. The method includes adding a composition having an acrylic acid 2-acrylamido-2-methylpropyl sulfonic acid copolymer, combined with a synergistically effective amount of oligomeric phosphinosuccinic acid to seawater or recirculation brine in a desalting process to produce water for drinking and industrial applications. The method also includes adding a composition including mono, bis, and oligomeric phosphinosuccinic acid adducts to the desalting process.

15 Claims, No Drawings

METHOD OF INHIBITING SCALE FORMATION AND DEPOSITION IN DESALINATION SYSTEMS

CROSS REFERENCE TO RELATED APPLICATIONS

This application is a continuation and claims the benefit of U.S. patent application Ser. No. 11/876,375, filed on Oct. 22, 2007, now abandoned, and entitled "Method of Inhibiting Scale Formation and Deposition in Desalination Systems," which is incorporated herein by reference in its entirety.

TECHNICAL FIELD

This invention relates to methods of preventing scale formation and deposition in desalting processes. More specifically, the invention relates to a method of using a scale-inhibiting composition including a copolymer of 2-acrylamido-2-methyl propyl sulfonic acid and acrylic acid. The invention has particular relevance to using a composition including a combination of the copolymer and the phosphinosuccinic acid oligomer or oligomeric phosphinosuccinic acid adducts in thermal and membrane desalting processes to produce potable water from a saline aqueous source.

BACKGROUND

Desalting, desalination, or desalinization refers to water treatment processes that remove salts from water. These water treatment processes are typically used to produce potable or drinking water from seawater or brackish water. Commercially available desalting processes may be categorized into major processes and minor processes. Major processes include temperature-driven or thermal processes and pressure-driven or membrane processes. Thermal processes include multi-stage flash distillation, multiple-effect distillation, and vapor compression. Membrane processes include electrodialysis and reverse osmosis. Minor processes include freezing, membrane distillation, and solar humidification.

Scale formation and deposition is a significant problem in equipment used in desalting processes. Scale forms when the concentration of a dissolved mineral exceeds its solubility limit and the mineral precipitates. The temperature, pH, water composition, and residence time, for example, of the thermal desalination process determine the types of scale likely to form and thus the scale control requirement. At lower temperatures (e.g., from about 80° C. to about 85° C.), calcium carbonate ($CaCO_3$) scale typically forms. Temperatures from about 90° C. to about 95° C. generally cause $Mg(OH)_2$ scale. Typically, calcium sulfate ($CaSO_4$) is a major contributor to scale formation when seawater or salt water approaches about 100° C. or higher. $CaSO_4$ material forms a hard scale that coats any tubes or surfaces present. Scale creates thermal and mechanical problems and is sometimes difficult to remove, especially in the case of $CaSO_4$ scale. Membrane processes typically have scale formation problems in the reject stream and membrane fouling due to scale build-up.

A known method of preventing scale formation includes controlling the seawater concentration levels (recovery) and temperature in thermal desalination processes. Multi-stage flash distillation plants usually operate at temperatures from 90° C. to 110° C. and operating the process at higher temperatures increases the efficiency, with a concomitant increase in the potential for scale formation and accelerated corrosion of metal surfaces. Chemical scale inhibitors are also used in both thermal and membrane processes. Commercially available examples include Belgard® and Flocon®, from BWA Water Additives, and Sokalan® PM10 and PM15, from BASF—The Chemical Company.

Reverse osmosis end users frequently employ chemical pretreatments, such as the addition of polymeric scale inhibitors/dispersants to inhibit undesirable mineral scaling. In some cases, inorganic inhibitors, such as sodium hexametaphosphate (SHMP), are used. For example, U.S. Pat. No. 4,563,284 discloses a method for inhibiting formation and deposition of scale-forming salts by adding a phosphonocarboxylic acid and a telemetric phosphinecarboxylic acid that contains features of both phosphonates and polyacrylates. U.S. Pat. No. 4,762,621 discloses a scale inhibitor comprising a copolymer of an acrylic acid and a lower alkyl ester of itaconic acid. U.S. Pat. No. 4,784,774 discloses a scale inhibitor containing a homopolymer of maleic acid or a copolymer of a monounsaturated monocarboxylic or dicarboxylic acid or salt thereof containing 3 to 5 carbon atoms and a phosphonoalkane carboxylic acid.

Thus, a major operating problem in seawater distillation plants and reverse osmosis systems is the formation of mineral scales, which reduce heat transfer, plug tubes, foul membranes, and ultimately lower the rated capacity of a plant and increase costs. As industry recognizes the need for new scale inhibitors, there exists a need to develop improved methods of using scale inhibitors.

SUMMARY

Accordingly, a method of inhibiting scale formation in desalination systems is disclosed. The method includes inhibiting formation and deposition of scale in a desalination process by adding to a saline aqueous source an effective amount of a scale-inhibiting composition having a copolymer of 2-acrylamido-2-methyl propyl sulfonic acid and acrylic acid. In an embodiment, the method further includes combining the copolymer with an oligomeric phosphinosuccinic acid ("PSO") to achieve an unexpected and surprising synergistic effect for scale-inhibition. In an embodiment, the method includes inhibiting corrosion in a desalination process by adding an effective amount of the described composition. It should be appreciated that the described copolymer of 2-acrylamido-2-methyl propyl sulfonic acid and acrylic acid may be used either alone or in synergistic combination with a described oligomeric phosphinosuccinic acid.

In one embodiment, the scale-inhibiting composition includes a mixture of 2-acrylamido-2-methyl propyl sulfonic acid and acrylic acid copolymer with a phosphinosuccinic acid oligomer having formula $[R_X—(POOM)-R1_Y]$. R and R1 independently are H, [CH(COOM)], or [CH(COOM)-CH(COOM)]. X and Y are either 0 or a small whole number, the sum of X and Y being greater than 2. M is chosen independently at each occurrence from the group consisting of: H, Na, K, $NH_4$, the like, or combinations thereof.

In another embodiment, the scale-inhibiting composition includes a synergistic mixture of 2-acrylamido-2-methyl propyl sulfonic acid and acrylic acid copolymer with mono, bis, and oligomeric phosphinosuccinic acid adducts. The composition has a copolymer portion and an acid adduct portion. The ratio of the copolymer portion to the acid adduct portion is further explained herein. Viewing the acid adduct portion on its own, for example, the composition may include about 20 mole percent to about 85 mole percent bis phosphinosuccinic acid adduct. Preferably, the acid adduct portion includes about 36 mole percent to about 49 mole percent bis phosphinosuccinic acid adducts and about 26 mole percent to about 35 mole percent oligomeric phosphinosuccinic acid adducts.

In a further embodiment, the scale-inhibiting composition includes a synergistic combination having a 2-acrylamido-2-methyl propyl sulfonic acid and acrylic acid copolymer portion and a PSO-based portion. The PSO-based portion includes, for example, less than about 22 mole percent monosodium phosphinicobis-succinic acid; less than about 26 mole percent monosodium phosphinico-succinic acid; less than about 12 mole percent sodium phosphosuccinic acid; less than about 5 mole percent sodium phosphate; less than about 6 mole percent sodium phosphate; less than about 6 mole percent sodium hypophosphite; and greater than about 32 mole percent phosphinosuccinic acid oligomer. In another embodiment, the PSO-based portion includes about 40 weight percent maleic anhydride reaction products (including phosphinosuccinic acid oligomers).

It is an advantage of the invention to provide a method of inhibiting scale formation and deposition in commercial desalination processes, such as thermal and membrane desalination processes.

It is another advantage of the invention to provide a method of using a 2-acrylamido-2-methyl propyl sulfonic acid and acrylic acid copolymer to inhibit scale formation and deposition in commercial desalting processes.

Another advantage of the invention is to provide a scale-inhibiting composition for commercial desalting processes including a synergistic combination of a 2-acrylamido-2-methyl propyl sulfonic acid and acrylic acid copolymer and an oligomeric phosphinosuccinic acid.

An additional advantage of the invention is to provide a method of inhibiting formation and deposition of scales, such as calcium sulfate, calcium carbonate, magnesium hydroxide, magnesium carbonate, and other scales.

A further advantage of the invention is to provide a scale inhibitor that allows higher operating temperatures of thermal desalination processes to increase distillate and/or permeate recovery and reduce costs.

An additional advantage of the invention is to provide a method of using a 2-acrylamido-2-methyl propyl sulfonic acid and acrylic acid copolymer alone and in synergistic combination with an oligomeric phosphinosuccinic acid composition to inhibit corrosion in commercial desalination processes.

Additional features and advantages are described herein, and will be apparent from, the following Detailed Description and Examples.

DETAILED DESCRIPTION

Many different types of commercial desalination or desalting processes or operations exist. This disclosure serves to capture all types of such operations. The methods described herein may be used in any suitable desalination process. Representative commercial desalting processes include thermal processes, such as multi-stage flash distillation, multiple-effect distillation, and vapor compression, and membrane processes, such as electrodialysis and reverse osmosis. The described methods of inhibiting scale may also be used in processes including as freezing, membrane distillation, and solar humidification.

Scale-Inhibiting Composition

The described 2-acrylamido-2-methyl propyl sulfonic acid and acrylic acid copolymer scale inhibitors of the invention can be used alone or in synergistic combination with phosphinosuccinic acid oligomer-based ("PSO-based") compounds. Such PSO-based compounds are described in U.S. patent application Ser. No. 11/622,054, entitled "METHOD OF INHIBITING SCALE FORMATION AND DEPOSITION IN DESALINATION SYSTEMS," which is incorporated by reference in its entirety and partially reproduced herein. Further, these scale inhibitors may be combined with other scale inhibitors, corrosion inhibitors, biocides, dispersants, and any other additives or adjuncts used in commercial desalination processes (described in more detail below). Such combinations, in some embodiments, exert a synergistic effect in terms of corrosion inhibition, scale inhibition, dispersancy, and/or microbial growth.

The described compositions are effective at any pH. The pH in desalination systems, however, is typically from about 6.5 to about 9.5 and may be as low as about 5 to about 6. In one embodiment, the described composition includes a pH-controlling chemical. That is, the composition includes any suitable chemical or compound that is capable of adjusting pH, controlling pH, and/or maintaining pH. Representative pH-controlling chemicals include trisodium phosphate, sodium metaborate, ammonium carbonate, sodium hydroxide, potassium hydroxide, lithium hydroxide, tetramethylammonium hydroxide, ammonium hydroxide, magnesium hydroxide, magnesium carbonate, sodium silicate, sodium carbonate, sulfuric acid, hydrochloric acid, inorganic and organic pH buffers, the like, and combinations thereof.

In an embodiment, the scale-inhibiting composition of the invention includes a high phosphinosuccinic acid oligomer content, as described in U.S. Pat. No. 5,023,000. In this embodiment, the scale-inhibiting composition includes less than about 22 mole percent monosodium phosphinicobis-succinic acid; less than about 26 mole percent monosodium phosphinico-succinic acid; less than about 12 mole percent sodium phosphosuccinic acid; less than about 5 mole percent sodium phosphate; less than about 6 mole percent sodium phosphate; less than about 6 mole percent sodium hypophosphite; and greater than about 32 mole percent phosphinosuccinic acid oligomer of the general formula $[R_X—(POOM)-R1_Y]$. R and R1 independently are H, [CH(COOM)], or [CH(COOM)-CH(COOM)]. X and Y are 0 or a small whole number, the sum of X and Y being greater than 2. M is chosen independently at each occurrence from H, Na, K, $NH_4$, the like, or combinations thereof. A representative synthesis procedure is explained in Example VII below.

In another embodiment, the composition includes a PSO-based scale inhibitor having mono (Formula I) and bis(Formula II) oligomeric phosphinosuccinic acid adducts (as shown below) as well as one or more oligomeric species. While the mono and his adducts of Formulas I and II are represented below as neutral, organophosphinic acid species, it should be understood that the phosphinic and carboxylic acid groups may also exist in salt form. In alternative embodiments, the mixture may also contain some phosphonosuccinic acid derivatized from the oxidation of adduct Formula I, as well as impurities such as various inorganic phosphorous byproducts of formula $(H_2PO_2)^-$, $(HPO_3)^{2-}$, and $(PO_4)^{3-}$.

Formula I

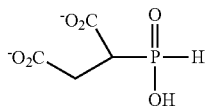

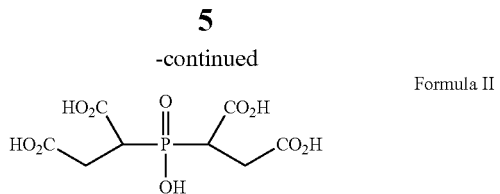

Formula II

Possible structures for the oligomeric species are proposed in U.S. Pat. Nos. 5,085,794, 5,023,000, and 5,018,577 (each incorporated herein by reference in their entirety). In addition, the oligomeric species may also contain esters of phosphono-succinic acid, where the phosphonate group is esterified with a succinate-derived alkyl group. The mono, bis, and oligomeric components are typically characterized by a group of peaks in the proton decoupled phosphorus NMR spectrum in water at pH 5 as follows: mono: one peak between 26 to 29 ppm; bis: two peaks between 30 to 35 ppm; and oligomer: multiple peaks between 29 to 33 ppm.

In a preferred aspect of the invention, the composition includes from about 20 to about 85 mole percent, based on phosphorous, of the bis adduct. In an embodiment, the composition includes about 36 mole percent to about 49 mole percent bis phosphinosuccinic acid adducts and about 26 mole percent to about 35 mole percent oligomeric phosphinosuccinic acid adducts. The composition is prepared by adding hypophosphite to a maleic acid or fumaric acid slurry or solution in water to create a reaction mixture according to an embodiment. A free radical initiator is then introduced to the reaction mixture to effect a reaction. In the case of a slurry, solids content is not critical as long as the slurry can be mixed. Typically, the slurry has a solids concentration of about 35 weight percent to about 50 weight percent.

The reaction mixture is optionally heated, preferably at from about 40° C. to about 75° C., followed by addition of hypophosphite to affect conversion to the desired phosphinosuccinic acid adducts in a reasonably short period of time. As used herein, "hypophosphite" means hypophosphorous acid or a salt of hypophosphorous acid, such as sodium hypophosphite. The reaction mixture may be partially or totally neutralized with base in accordance with an embodiment. Aqueous sodium hydroxide is a preferred base, which provides a slurry including maleic and/or fumaric acid salts. Other bases capable of forming salts with fumaric or maleic acid, such as potassium hydroxide and ammonium hydroxide, may also be used. The base may be added before, after, or concurrently with the hypophosphite.

Suitable free radical initiators include persulfates, peroxides and diazo compounds. A preferred initiator is ammonium persulfate. The initiator may be added to the reaction mixture all at once or slowly introduced to the reaction mixture over a period of several hours. The initiator is preferably introduced to the mixture in an amount of between about 10 mole percent to about 15 mole percent, based on hypophosphite.

In a procedure for preparing phosphinic acid compositions, maleic acid with hypophosphite are used in about a 2:1 ratio. The reaction products are predominately mono, bis, and oligomeric phosphinosuccinic acid adducts and inorganic phosphates as described above. In an embodiment, if the reaction is carried out with fumaric acid (trans 1,4-butanedioic acid) instead of maleic acid (cis 1,4-butanedioic acid) the ratios of mono, bis, and oligomeric phosphinosuccinic acid adducts are altered. This altered composition results in a composition that displays more effective corrosion and scale inhibition properties relative to the composition that is produced when maleic acid is used under the same reaction conditions. In particular, the fumaric acid-based process provides a simple means to increase the amount of bis adduct in the composition and reduce the amount of byproducts in the composition due to a more efficient conversion of hypophosphite and fumaric acid raw materials into the desired phosphinic acids.

The fumaric acid-based process is, in general, very similar to the maleic acid-based process except that fumaric acid is used in place of maleic acid. Preferably, the fumaric acid is produced by isomerization of maleic acid. More preferably, the fumaric acid is prepared by hydrolyzing maleic anhydride in aqueous solution to prepare an aqueous solution of maleic acid, which is then isomerized using heat or a suitable catalyst to form an aqueous solution of fumaric acid. The isomerization can be accomplished thermally only at high temperatures, so a catalyst is usually used to allow the reaction to proceed under relatively mild conditions. Suitable catalysts for the transformation include thiourea and mixtures of oxidants and various bromine compounds. A preferred catalyst is a mixture of a bromide salt with a persulfate salt (See U.S. Pat. No. 3,389,173; Ind. Eng. Chem. Res. 1991, 30, 2138-2143; Chem. Eng. Process, 30 (1991), 15-20). Preferably, a mixture of sodium bromide and ammonium persulfate is used to affect this transformation in aqueous media.

In an embodiment, the aqueous fumaric acid solution is then converted to the phosphinic acid-based scale inhibitor of this invention by addition of hypophosphite and a radical initiator to the fumaric acid solution as described above. A preferred ratio of fumaric acid to hypophosphite in the reaction mixture is about 1.75:3. Preferably, the initiator is added over a period of several hours while the reaction mixture is heated at about 60° C. The reaction is then allowed to proceed until the hypophosphite is almost completely converted to organophosphorous products.

In an embodiment, the scale-inhibiting composition of the disclosed method includes a copolymer of 2-acrylamido-2-methylpropyl sulfonic acid and acrylic acid. According to alternative embodiments, this scale-inhibiting composition may be used alone or in combination with described PSO-based or other scale inhibitors. As described in the Examples below, combinations of these copolymers with PSO-based corrosion inhibitors have an unexpected synergistic effect.

Such copolymers typically have a molecular weight from about 1,000 to about 100,000 and may contain from about 5 to about 75 mole percent 2-acrylamido-2-methylpropyl sulfonic acid and from about 95 to about 25 mole percent acrylic acid. The preferred polymers, however, have a molecular weight from about 1,000 to about 10,000 and contain from about 5 to about 50 mole percent 2-acrylamido-2-methylpropyl sulfonic acid and from about 95 to about 50 mole percent acrylic acid.

Method of Application

As mentioned above, it is contemplated that the method of the invention may be employed in any type of desalination, desalting, or similar process. Further, the disclosed method may be employed for inhibiting any type of scale. Representative scales are those including constituents such as calcium, phosphate, magnesium, sulfate, bicarbonate, silicate, carbonate, iron, the like, and combinations thereof. Examples of common scales include calcium sulfate, calcium carbonate, magnesium hydroxide, and magnesium carbonate.

Desalting devices essentially separate an input stream of water having high salt concentration into two output streams, one having a low concentration of dissolved salts (potable, drinking, or fresh water) and the other having concentrated salts (e.g., brine recirculation stream or waste stream). In a preferred embodiment, the method of the invention includes adding an effective amount of the scale-inhibiting composition into the input stream or the brine recirculation stream of such a device. Examples of commercial desalting devices are provided above. In the case of thermal processes, the process may be operated at any suitable temperature. In a preferred embodiment, the thermal process is operated from about 80° C. to about 120° C. In another preferred embodiment, the thermal process is operated from about 120° C. to about 160° C. or higher.

It should be understood that the scale-inhibiting composition may be added to the water at any point or stage in the process, preferably to the input stream of seawater or to the recirculation brine. Although not required to implement the method of the invention, it is contemplated that the scale-inhibiting composition may be combined with antifoams, biocides, heat transfer enhancement surfactants, one or more corrosion inhibitors, one or more other scale inhibitors (e.g., polyacrylate, polycarboxylate, or polymaleic acid), one or more fluorescent tracers, one or more water treatment polymers, or any other suitable adjunct or additional component. Any such adjuncts or components may be part of an existing scale-inhibitive program to which the invention becomes an additional component or program. Adjuncts may be part of the scale-inhibiting composition or may be another separate composition or compositions. In alternative embodiments, such components may be added simultaneously or sequentially with the scale-inhibiting composition of the invention.

Exemplary corrosion and other scale inhibitors include tungstate; molybdate; vanadate; phosphate; phosphonate; phosphinate; silicate; borate; zinc and its salts; polycarboxylates, such as polycarboxylic acid; benzoic acid; the like; combinations thereof; or any other suitable corrosion or scale inhibitors. Exemplary water treatment polymers include polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, sulfomethylated acrylamide, the like, and combinations thereof.

The PSO-based scale-inhibiting composition of the invention is added to the saline aqueous source in an amount of from 0.01 ppm to about 10,000 ppm, preferably from about 0.1 ppm to about 100 ppm, and most preferably from about 1 ppm to about 30 ppm, based on saline aqueous source volume. The saline aqueous source may be any saline source, such as seawater, brackish water, brine, or the like.

A preferred dosage range for 2-acrylamido-2-methylpropyl sulfonic acid copolymers is from about 0.01 ppm to about 10,000 ppm, based on the saline aqueous source. In a more preferred embodiment, the dosage range is from about 0.01 to about 1,000 ppm. In alternative embodiments, the dosage range may be from about 0.01 ppm to about 100 ppm, from about 0.1 ppm to about 100 ppm, from about 0.1 ppm to about 10 ppm, from about 1 ppm to about 30 ppm, or other suitable ranges.

In embodiments where the 2-acrylamido-2-methylpropyl sulfonic acid copolymers and the described PSO-based scale-inhibitors are used in synergistic combination, a preferred weight-to-weight ratio is from about 5:1 to about 1:5. A more preferred weight-to-weight ratio is from about 3:1 to about 1:3 or from about 2:1 to about 1:2. In a preferred embodiment, an unexpected synergistic effect was apparent when the copolymer to PSO-based weight-to-weight ratio was about 1:2. Preferred dosages for this synergistic combination are from about 0.01 ppm to about 10,000 ppm, based on the saline aqueous source. In a more preferred embodiment, the dosage range is from about 0.01 to about 1,000 ppm. In alternative embodiments, the dosage range may be from about 0.01 ppm to about 100 ppm, from about 0.1 ppm to about 100 ppm, from about 0.1 ppm to about 10 ppm, from about 1 ppm to about 30 ppm, or other suitable ranges.

In an embodiment, the described composition is added to the system at specified dosages at certain intervals or may be monitored by any analytical chemical means known to those of skill in the art. In alternative embodiments, monitoring the composition dosage and concentration in the system includes using molecules having fluorescent or absorbent moieties (i.e., tracers). Such tracers are typically inert and added to the system in a known proportion to the scale-inhibiting composition. "Inert" as used herein means that an inert tracer (e.g., an inert fluorescent tracer) is not appreciably or significantly affected by any other chemistry in the desalination system, or by other system parameters, such as metallurgical composition, microbiological activity, biocide concentration, heat changes, overall heat content, or other parameters. "Not appreciably or significantly affected" means that an inert fluorescent compound has no more than about 10 percent change in its fluorescent signal, under conditions normally encountered in desalination systems.

Representative inert fluorescent tracers suitable for use in the method of the invention include 1,3,6,8-pyrenetetrasulfonic acid, tetrasodium salt (CAS Registry No. 59572-10-0); monosulfonated anthracenes and salts thereof, including, but not limited to 2-anthracenesulfonic acid sodium salt (CAS Registry No. 16106-40-4); disulfonated anthracenes and salts thereof (See U.S. patent application Ser. No. 10/631,606, filed Jul. 31, 2003, entitled "Use of Disulfonated Anthracenes as Inert Fluorescent Tracers," now pending, which is incorporated herein by reference in its entirety); fluorescent tracers as listed in U.S. Pat. No. 6,966,213 B2 (incorporated herein by reference in its entirety); other suitable fluorescent compounds; and combinations thereof. These inert fluorescent tracers are either commercially available under the tradename TRASAR® from Nalco Company® (Naperville, Ill.) or may be synthesized using techniques known to persons of ordinary skill in the art of organic chemistry.

In another embodiment, the described copolymer may include one or more fluorescing moieties within the copolymer structure. Such moieties may be incorporated into the 2-acrylamido-2-methylpropyl sulfonic acid or acrylic acid monomers or may be incorporated into the copolymer as a separate fluorescing monomer. Although it is contemplated that any suitable moiety may be used, exemplary fluorescent moieties and method of making such polymers are described in U.S. Pat. Nos. 5,986,030 and 6,344,531 B1, entitled "FLUORESCENT WATER-SOLUBLE POLYMERS."

Monitoring the concentration of the tracers and/or tagged polymers using light absorbance or fluorescence allows for precise control of the scale-inhibiting composition dosage. For example, the fluorescent signal of the inert fluorescent chemical may be used to determine the concentration of the scale-inhibiting composition or compound in the system. The fluorescent signal of the inert fluorescent chemical is then used to determine whether the desired amount of the scale-inhibiting composition or product is present in the desalination system and the feed of the composition can then be adjusted to ensure that the desired amount of scale-inhibitor is in the system.

EXAMPLES

The foregoing may be better understood by reference to the following examples, which are intended for illustrative purposes and are not intended to limit the scope of the invention.

Example 1

A 2.1:1 molar ratio of fumaric acid to hypophosphite was used in this Example. Crushed maleic anhydride briquettes, 75.9 parts, were added to 104.4 parts water in a 1 liter resin flask equipped with a mechanical stirrer, condenser, nitrogen inlet, and heater. The anhydride was allowed to hydrolyze at 40° C. to produce a maleic acid solution. The reaction was then heated to 60° C. and a solution of sodium bromide (0.16 parts dissolved in 0.20 parts water) was added, followed immediately by a solution of ammonium persulfate (0.43 parts dissolved in 1.49 parts water). Within 60 minutes, an exothermic reaction converted the maleic acid solution into 183.6 parts of a 49.2 wt. % slurry of fumaric acid in water, as verified by proton NMR.

Sodium hypophosphite monohydrate (38.9 parts) was added to 182.6 parts of a 49.2 wt. % slurry of fumaric acid in water contained in a 1 liter resin flask having a mechanical stirrer, condenser, nitrogen inlet, and heater. A solution of ammonium persulfate (10.9 g dissolved in 36.9 parts water) was then added over a period of 5 hours while maintaining a reaction temperature of 60° C. under a nitrogen blanket. The reaction solution was heated an additional 1 to 5 hours, and then adjusted to pH 6 under external cooling with 96.2 parts of a 50% aqueous solution of sodium hydroxide. Finally, 18 parts water was added.

The product, comprised of salts hypophosphite/fumarate adducts described in Table 1 below, displayed the following molar distribution of components, determined by phosphorous NMR analysis. The first dataset represents the average of four reactions run at 400 to 600 g scale according to the procedure described above. The second set of data represents a reaction carried out as described above except that the fumaric acid slurry was prepared by mixing fumaric acid with water at a 126 g scale.

TABLE 1

| Component | Mole Percent |
| --- | --- |
| Phosphinicobis (succinic acid) salts (Structure II) | 48, 45 |
| Phosphinicosuccinic acid salts (Structure I) | 17, 24 |
| Phosphonosuccinic acid salts | 8, 4 |
| Phosphinicosuccinic acid oligomer salts (Structure III) | 27, 27 |
| Hypophosphite, phosphite, and phosphate salts | <1, <1 |

Example 2

A 2.5:1 molar ratio of fumaric to hypophosphite was used in this Example. The reaction conditions were as described in Example 1. The product, including salts of hypophosphite/fumarate adducts described in Table 2 below, displays the following molar distribution of components as determined by phosphorous NMR analysis.

TABLE 2

| Component | Mole Percent |
| --- | --- |
| Phosphinicobis(succinic acid) salts (Structure II) | 49 |
| Phosphinicosuccinic acid salts (Structure I) | 7 |
| Phosphonosuccinic acid salts | 3 |
| Phosphinicosuccinic acid oligomer salts (Structure III) | 38 |
| Hypophosphite, phosphite, and phosphate salts | <1 |

Example 3

This is a comparative example, which used maleic acid instead of fumaric acid at the same 2.5:1 molar ratio as Example 2. It demonstrates that the results obtained with fumaric acid are unanticipated. The first dataset represents results obtained in the lab using the general procedure above, and the second dataset represents a plant run using the same mole ratio maleic to fumaric.

The general reaction conditions described in Example 1 were repeated except that maleic acid was substituted for fumaric acid at the same molar concentration. The product, comprised of salts of hypophosphite/maleate adducts described in Table 3 below, displayed the following molar distribution of components determined by phosphorous NMR analysis.

TABLE 3

| Component | Mole Percent |
| --- | --- |
| Phosphinicobis(succinic acid) salts (Structure II) | 22, 17 |
| Phosphinicosuccinic acid salts (Structure II) | 24, 22 |
| Phosphonosuccinic acid salts | 2, 12 |
| Phosphinicosuccinic acid oligomer salts (Structure III) | 43, 35 |
| Hypophosphite, phosphite, and phosphate salts | 5, 8 |

Example 4

This example used a low 1.75:1 ratio of fumaric to hypophosphite. It did not yield >30% bis product and had a higher level of undesirable inorganic phosphorous. The reaction conditions are as described in Example 1, except that a larger amount of hypophosphite was employed so that the molar ratio of fumaric acid to hypophosphite was 1.75:1. The product, comprised of salts of hypophosphite/fumarate adducts described in Table 4 below, displayed the following molar distribution of components determined by phosphorous NMR analysis.

TABLE 4

| Component | Mole Percent |
| --- | --- |
| Phosphinicobis(succinie acid) salts (Structure II) | 30 |
| Phosphinicosuccinic acid salts (Structure I) | 35 |
| Phosphonosuccinic acid salts | 8 |
| Phosphinicosuccinic acid oligomer salts (Structure III) | 22 |
| Hypophosphite, phosphite, and phosphate salts | 6 |

Example 5

In this Example, a 2.1:1 molar ratio of substantially neutralized sodium fumarate slurry was used to demonstrate that the process works over a wide pH range by use of a salt fumaric acid. In this case, about 80% of the fumaric acid carboxylic acids were converted to the sodium carboxylate form, and the pH increased from about 1 to about 6.

Sodium hypophosphite monohydrate (13.0 grams) was added to 61.0 of a 49.1 wt % slurry of fumaric acid in water contained in a 250 ml resin flask equipped with a mechanical stirrer, condenser, nitrogen inlet, and heater. Aqueous 50% sodium hydroxide (32.1 grams) was then added under mixing and cooling. A solution of ammonium persulfate (3.6 grams dissolved in 6.0 grams water) was then added over a period of 5 hours while the reaction temperature was maintained at 60° C. under a nitrogen blanket. The reaction solution was heated 1 to 5 hours further, and 6 grams water was added. The product, comprised of salts of hypophosphite/fumarate adducts described in Table 5 below, displayed the following molar distribution of components, as determined by phosphorous NMR analysis.

TABLE 5

| Component | Mole Percent |
| --- | --- |
| Phosphinicobis(succinic acid) salts (Structure II) | 46 |
| Phosphinicosuccinic acid salts (Structure I) | 18 |
| Phosphonosuccinic acid salts | 8 |
| Phosphinicosuccinic acid oligomer salts (Structure III) | 26 |
| Hypophosphite, phosphite, and phosphate salts | <1 |

Example 6

Step 1: Monosodium Phosphinocobis(dimethyl succinate): A 2.1:1 molar ratio of dimethyl maleate to hypophosphite was used in this Example. Sodium hypophosphite, 7.325 parts, was added to 6.25 parts water and 12.5 parts ethanol in a resin flask equipped with a magnetic stirrer, condenser, nitrogen inlet, heater, and a dropping funnel. This solution was heated to 80° C. A solution consisting of 20.75 parts dimethyl maleate, 0.86 parts benzoyl peroxide (70% solution), and 25 parts ethanol was then added dropwise to the reaction flask over a period of 4.75 hours. The reaction mixture was heated for an additional 15 minutes then cooled. The solvent was removed by rotary evaporation under reduced pressure.

Step 2: Sodium Phosphinocobis(succinate): 34.5 parts of monosodium phosphinocobis(dimethyl succinate) was added to 20 parts water and 55.4 parts of a 50% aqueous solution of sodium hydroxide in a reaction flask equipped with a magnetic stirrer, condenser, and heater. The reaction was heated to 100° C. and maintained at that temperature for 2 hours. The product was diluted with 20 parts water and then neutralized with 40.4 parts hydrochloric acid to about pH 6.

The product, comprised of salts of hypophosphite/maleate adducts described in Table 6 below, displayed the following molar distribution of components determined by phosphorous NMR analysis.

TABLE 6

| Component | Mole Percent |
| --- | --- |
| Phosphinicobis(succinic acid) salts (Structure II) | 88 |
| Phosphinicosuccinic acid salts (Structure I) | 9 |
| Phosphonosuccinic acid salts | 1 |
| Hypophosphite, phosphite, and phosphate salts | 2 |

Example 7

Maleic anhydride (306.25 g, 3.125 moles) briquettes were crushed and added to a 1.5 liter reaction flask along with about 516.9 grams of water. The suspension was stirred for about 15 minutes to allow the maleic anhydride to dissolve and hydrolyze. This initial step raised the temperature of the solution from 21° C. to 32° C. After stirring for an additional 45 minutes, the mild exotherm began to subside and sodium hypophosphite monohydrate (132.5 g, 1.25 moles) was added. A second mild exotherm occurred as sodium hypophosphite was dissolved. Nitrogen purging was begun and the reaction mixture was heated to 60° C. over 30 minutes. Ammonium persulfate solution was added (99.75 g of 37.22% aqueous solution) over about 4 hours. Temperature was controlled at 60° C. to 61° C. When addition of the catalyst was complete, heating at 60° C. was continued for between about 2 and 2.5 hours.

Heating was continued and incrementally increased to 80° C. until the oxidant was consumed or destroyed, as indicated by a negative starch-iodide test. The clear, yellow solution was highly acidic (pH 1). The concentration of the final product before neutralization was 44.77% (assuming complete incorporation of maleic acid and sodium hypophosphite). Analysis of the reaction mixture was done using $^{31}P$ and $^{13}C$ NMR, showing the absence of maleic acid in the final product mixture.

A sample (100.0 g of the 44.77% solution described above) was neutralized to pH 7.0 by drop-wise addition of 50% sodium hydroxide. Solution temperature was observed and maintained at 60° C. or less with ice-water bath cooling. The concentration of the resultant solution was 30.79% (calculated based on dilution).

Example 8

A fresh solution of calcium sulfate test water having 5,000 ppm Ca (as $CaCO_3$) at a pH of 8.8 to 9.0 was prepared and used for each test. Test water was analyzed for Ca concentration by atomic absorption prior to heating. The Parr Reactor (available from Parr Instrument Company in Moline, Ill.) test protocol included a Teflon-line autoclave, designed with a sampling line and stirrer. The reactor was charged with 250 ml of freshly prepared test water and was sealed and pressurized to 40 psig with nitrogen gas. For low temperature testing, the autoclave was heated to 60° C. with mild stirring of the test water. Upon reaching test temperature, stirring was stopped and the test water was held at 60° C. for 24 hours. Samples of the test water were then removed via the sample line, which was submerged about one-third from the liquid/gas interface, and immediately fixed for Ca analysis by atomic absorption (Table 7). The autoclave was then heated to 100° C. with no additional stirring for high temperature testing. The temperature was held at 100° C. for another 24 hours. After purging the sample line, samples of the high temperature test water were collected and immediately fixed for atomic absorption Ca analysis (Table 8).

TABLE 7

| Treatment | Actives dosage (ppm) | Final Ca (ppm) | % Ca decrease | % $CaSO_4$ scale-inhibition |
| --- | --- | --- | --- | --- |
| Blank | 0 | 2,175 | 56.50 | 0 |
| Polymaleic acid | 31 | 4,915 | 1.70 | 96.99 |
| PSO | 31 | 4,820 | 3.60 | 93.63 |
| PSO | 3.10 | 4,295 | 14.10 | 75.04 |
| 50/50 blend PSO Polymaleic acid | 3.10 | 4,890 | 2.20 | 96.11 |
| 50/50 copolymer Acrylate Maleic acid | 31 | 4,460 | 10.80 | 80.88 |

TABLE 8

| Treatment | Actives dosage (ppm) | Final Ca (ppm) | % Ca decrease | % $CaSO_4$ scale-inhibition |
| --- | --- | --- | --- | --- |
| Blank | 0 | 1,885 | 62.90 | 0 |
| Polymaleic acid | 31 | 2,095 | 58.10 | 7.63 |
| PSO | 31 | 2,830 | 43.40 | 31.00 |
| PSO | 3.10 | 2,094 | 58.12 | 7.60 |
| 50/50 blend PSO Polymaleic acid | 3.10 | 1,990 | 60.20 | 4.29 |
| 50/50 copolymer Acrylate Maleic acid | 31 | 1,855 | 62.30 | 0.95 |

Example 9

Artificial seawater ("ASW") was prepared according to the following recipe (See Cavanaugh, G. M. ed (1975) *Formulae and Methods of the Marine Biological Laboratory Chemical Room*, Marine Biological Laboratory, Woods Hole, Mass.): 423 mM NaCl; 9 mM KCl; 9.27 mM $CaCl_2.2H_2O$ (or $CaCl_2$ anhydrous); 22.94 mM $MgCl_2.6H_2O$ (or $MgCl_2$ anhydrous); 25.5 mM $MgSO_4.7H_2O$ (or $MgSO_4$ anhydrous); and 2.14 mM $NaHCO_3$.

Two pH levels of 5.6 (Table 9) and 6.8 (Table 10) were tested with various levels of added scale inhibitor and various ASW concentration factors ("CF"). CFs were achieved by boiling and evaporating the water samples under atmospheric pressure at 100° C. until concentrated to the respective CF. CNTs (controls) received no scale-inhibiting treatment. PMAs received treatment with a composition including about 3 weight percent maleic acid, about 7.5 weight percent (3-methylphenyl)methyl butanedioic acid, about 3 weight percent (4-methylphenyl)methyl butanedioic acid, and about 39.5 weight percent poly(maleic acid). PSOs received treatment with a composition including about 0.225 weight percent sodium bromide, about 3.5 weight percent ammonium sodium sulfate, and about 40 weight percent maleic anhydride reaction products (including phosphinosuccinic acid oligomers) with sodium hypophosphite and ammonium persulfate sodium salt. FTU turbidity ("FTU") was measured using a Hach DR-2000 spectrophotometer after achieving the desired CF. The "ppms" in the tables below indicate concentration of PMA or PSO scale-inhibitor in the sample.

TABLE 9

| Sample | CF @3 ppm | FTU | CF @6 ppm | FTU | CF @12 ppm | FTU | CF @24 ppm | FTU |
| --- | --- | --- | --- | --- | --- | --- | --- | --- |
| CNT-1 | 1.00 | 0 | 1.00 | 0 | 1.00 | 0 | 1.00 | 0 |
| CNT-2 | 1.37 | 3 | 1.33 | 0 | 1.35 | 2 | 1.31 | 0 |
| CNT-3 | 1.53 | 7 | 1.56 | 5 | 1.59 | 5 | 1.61 | 7 |
| CNT-4 | 1.99 | 7 | 2.11 | 12 | 2.04 | 12 | 2.02 | 12 |
| CNT-5 | 2.78 | 8 | 6.65 | 25 | 6.65 | 25 | 2.49 | 16 |
| PMA-1 | 1.00 | 0 | 1.00 | 0 | 1.00 | 0 | 1.00 | 0 |
| PMA-2 | 1.40 | 3 | 1.33 | 0 | 1.33 | 0 | 1.48 | 0 |
| PMA-3 | 1.54 | 6 | 1.50 | 1 | 1.72 | 7 | 1.68 | 0 |
| PMA-4 | 2.18 | 6 | 2.12 | 12 | 2.32 | 14 | 1.95 | 1 |
| PMA-5 | 3.34 | 10 | 3.08 | 18 | 3.16 | 19 | 2.73 | 3 |
| PSO-1 | 1.00 | 0 | 1.00 | 0 | 1.00 | 0 | 1.00 | 0 |
| PSO-2 | 1.34 | 2 | 1.28 | 0 | 1.28 | 0 | 1.31 | 0 |
| PSO-3 | 1.47 | 4 | 1.60 | 2 | 1.66 | 0 | 1.60 | 0 |
| PSO-4 | 1.79 | 4 | 1.91 | 7 | 2.24 | 4 | 1.98 | 0 |
| PSO-5 | 2.38 | 9 | 2.71 | 12 | 2.75 | 5 | 2.40 | 0 |

TABLE 10

| Sample | CF @3 ppm | FTU | CF @6 ppm | FTU | CF @12 ppm | FTU | CF @24 ppm | FTU |
| --- | --- | --- | --- | --- | --- | --- | --- | --- |
| CNT-6 | 1.00 | 0 | 1.00 | 0 | 1.00 | 0 | 1.00 | 0 |
| CNT-7 | 1.26 | 68 | 1.26 | 54 | 1.30 | 56 | 1.25 | 68 |
| CNT-8 | 1.53 | 85 | 1.62 | 78 | 1.55 | 59 | 1.54 | 89 |
| CNT-9 | 1.94 | 115 | 2.18 | 102 | 2.11 | 87 | 1.90 | 108 |
| CNT-10 | 2.44 | 148 | 2.82 | 126 | 3.12 | 144 | 2.92 | 172 |
| PMA-6 | 1.00 | 0 | 1.00 | 0 | 1.00 | 0 | 1.00 | 0 |
| PMA-7 | 1.28 | 68 | 1.27 | 64 | 1.30 | 58 | 1.26 | 23 |
| PMA-8 | 1.60 | 89 | 1.55 | 76 | 1.56 | 86 | 1.55 | 53 |
| PMA-9 | 2.14 | 120 | 2.00 | 99 | 2.20 | 101 | 1.94 | 65 |
| PMA-10 | 2.78 | 160 | 2.57 | 123 | 3.30 | 150 | 2.91 | 97 |
| PSO-6 | 1.00 | 0 | 1.00 | 0 | 1.00 | 0 | 1.00 | 0 |
| PSO-7 | 1.24 | 61 | 1.22 | 68 | 1.26 | 56 | 1.23 | 62 |
| PSO-8 | 1.50 | 78 | 1.52 | 81 | 1.48 | 62 | 1.47 | 87 |
| PSO-9 | 1.86 | 102 | 1.94 | 104 | 1.94 | 88 | 1.76 | 107 |
| PSO-10 | 2.25 | 124 | 2.39 | 137 | 2.65 | 125 | 3.00 | 176 |

Example 10

Seawater (from the North Sea) was used for testing in this Example. Three pH levels of 5.5 (Table 11), 6 (Table 12), and 7 (Table 14) were tested with various levels of added scale inhibitor and various seawater concentration factors ("CF"). Samples were treated as in Example 9.

TABLE 11

| Sample | CF @12 ppm | FTU | CF @24 ppm | FTU |
| --- | --- | --- | --- | --- |
| CNT-1 | 1.00 | 2 | 1.00 | 2 |
| CNT-2 | 1.32 | 2 | 1.24 | 2 |
| CNT-3 | 1.59 | 3 | 1.55 | 3 |
| CNT-4 | 2.01 | 7 | 2.03 | 4 |
| CNT-5 | 2.74 | 9 | 2.80 | 6 |
| PMA-1 | 1.00 | 2 | 1.00 | 2 |
| PMA-2 | 1.34 | 2 | 1.21 | 2 |
| PMA-3 | 1.65 | 3 | 1.69 | 2 |
| PMA-4 | 2.28 | 7 | 1.95 | 3 |
| PMA-5 | 2.84 | 8 | 2.79 | 4 |
| PSO-1 | 1.00 | 2 | 1.00 | 2 |
| PSO-2 | 1.29 | 2 | 1.19 | 2 |
| PSO-3 | 1.55 | 3 | 1.55 | 2 |
| PSO-4 | 1.88 | 6 | 2.02 | 2 |
| PSO-5 | 2.58 | 9 | 2.47 | 2 |

TABLE 12

| Sample | CF @12 ppm | FTU | CF @24 ppm | FTU |
| --- | --- | --- | --- | --- |
| CNT-6 | 1.00 | 1 | 1.00 | 1 |
| CNT-7 | 1.26 | 1 | 1.31 | 1 |
| CNT-8 | 1.50 | 3 | 1.60 | 2 |
| CNT-9 | 2.34 | 2 | 1.96 | 3 |
| CNT-10 | 3.43 | 6 | 3.27 | 14 |
| PMA-6 | 1.00 | 1 | 1.00 | 1 |
| PMA-7 | 1.34 | 1 | 1.42 | 2 |
| PMA-8 | 1.49 | 2 | 1.64 | 2 |
| PMA-9 | 2.33 | 2 | 2.01 | 3 |
| PMA-10 | 2.82 | 3 | 3.00 | 8 |
| PSO-6 | 1.00 | 1 | 1.00 | 1 |
| PSO-7 | 1.28 | 1 | 1.31 | 1 |
| PSO-8 | 1.48 | 1 | 1.51 | 1 |
| PSO-9 | 2.02 | 2 | 1.82 | 2 |
| PSO-10 | 2.72 | 5 | 2.97 | 8 |

TABLE 13

| Sample | CF @12 ppm | FTU | CF @24 ppm | FTU |
| --- | --- | --- | --- | --- |
| CNT-11 | 1.00 | 1 | 1.00 | 1 |
| CNT-12 | 1.24 | 32 | 1.27 | 15 |
| CNT-13 | 1.69 | 53 | 1.55 | 17 |
| CNT-14 | 2.13 | 70 | 2.08 | 26 |
| CNT-15 | 3.57 | 122 | 3.39 | 51 |
| PMA-11 | 1.00 | 1 | 1.00 | 1 |
| PMA-12 | 1.22 | 1 | 1.25 | 8 |
| PMA-13 | 1.61 | 19 | 1.53 | 21 |
| PMA-14 | 2.02 | 28 | 2.05 | 33 |

TABLE 13-continued

| Sample | CF @12 ppm | FTU | CF @24 ppm | FTU |
|---|---|---|---|---|
| PMA-15 | 3.24 | 55 | 3.30 | 64 |
| PSO-11 | 1.00 | 1 | 1.00 | 1 |
| PSO-12 | 1.22 | 31 | 1.21 | 4 |
| PSO-13 | 1.53 | 54 | 1.46 | 38 |
| PSO-14 | 1.92 | 76 | 1.85 | 53 |
| PSO-15 | 2.97 | 118 | 2.28 | 69 |

Example 11

A capillary blocking ("CBT") test was used to evaluate the efficacy of the disclosed formulations as compared to other commercially available products. Artificial seawater (ASW, as described above) and with a specific total dissolved solids content ("TDS") was forced through a heated capillary. All ASW was purged with nitrogen in a pressure vessel for 30 min prior to analysis. The CBT included a stainless steel vessel with a plastic sample container. The vessel was pressurized with nitrogen to force the sample water through 1 mm inner diameter stainless steel tubing. To preheat the sample water, about 25 cm of the tubing was submerged in an oil-heating bath. The preheated water entered a 15 cm long (0.1 mm inner diameter) stainless steel capillary submersed in the oil-heating bath. Flow through the capillary was determined by weighing the collected water every 5 min, which was automated by a Microsoft® Excel macro running on a laptop computer and connected to a balance. The setup was designed to have sample flow speeds (i.e., linear speed through the heat exchange tube) similar to that of multi-stage flash ("MSF") heat exchange tubes (about 1 to 2.5 m/sec).

The CBT typically tests all aspects of MSF operation except long operation times. The performance of a scale-inhibiting product in this test depends its interaction on a plethora of different processes such as crystal formation, crystal growth, crystal dispersion, scale adherence, interplay between different scale types, etc.

The following tables illustrate CBT results comparing various scale-inhibiting compositions with different TDS values at different temperatures, shown in milliliters flow through the capillary at the given time interval in minutes. Product A (available, for example, under the tradename PC-2040 from Nalco® Company in Naperville, Ill.) is a mixture of a copolymer of 2-acrylamido-2-methylpropyl sulfonic acid and acrylic acid (available, for example, under the tradename TRC-233® from Nalco® Company in Naperville, Ill.) and a PSO-based corrosion inhibitor, where Component 1 is a PSO-based formulation and Component 2 is the copolymer formulation. Belgard® EV is available from BWA Water Additives and Sokalan® PM10 is available from BASF—The Chemical Company.

Table 14 shows CBT results with 96 g/l TDS at 120° C. at a product dose of 1 ppm. Table 15 shows CBT results with 64 g/l TDS at 120° C. at a product dose of 3 ppm. Table 16 shows CBT results with 65 g/l TDS at 120° C. at a product dose of 3 ppm. Table 17 shows CBT results with 96 g/l TDS at 130° C. at a product dose of 4 ppm. Table 18 shows CBT results with 96 g/l TDS at 120° C. at the indicated product dose, where a synergistic effect between Component 1 and Component 2 was observed.

TABLE 14

| Time | Blank | Product A | Sokalan PM10 | Belgard EV |
|---|---|---|---|---|
| 0 | 0 | 0 | 0 | 0 |
| 5 | 3.16 | 3.115 | 3.14 | 3.18 |
| 10 | 6.94 | 7.175 | 7.25 | 7.28 |
| 15 | 10.18 | 12.025 | 12.12 | 12.26 |
| 20 | 12.62 | 17.365 | 17.42 | 17.68 |
| 25 | 14.35 | 22.16 | 21.7 | 22.52 |
| 30 | 15.77 | 26.365 | 25.05 | 26.56 |
| 35 | 17 | 30.02 | 27.73 | 29.9 |
| 40 | 18.05 | 33.225 | 29.9 | 32.76 |
| 45 | 19.03 | 36.13 | 31.53 | 35.26 |

TABLE 15

| Time | Blank | Product A | Sokalan PM10 | Belgard EV |
|---|---|---|---|---|
| 0 | 0 | 0 | 0 | 0 |
| 5 | 3.37 | 3.45 | 3.42 | 3.535 |
| 10 | 7.68 | 7.83 | 7.73 | 8.165 |
| 15 | 12.665 | 13.09 | 12.9 | 13.15 |
| 20 | 16.615 | 19.145 | 18.85 | 16.965 |
| 25 | 20 | 25.375 | 24.95 | 21.34 |
| 30 | 22.94 | 31.66 | 31.06 | 25.385 |
| 35 | 25.665 | 37.865 | 37.19 | 29.225 |
| 40 | 27.87 | 44.125 | 43.26 | 32.895 |
| 45 | 29.935 | 50.355 | 49.31 | 36.465 |

TABLE 16

| Time | Blank | Product A | Sokalan PM10 | Belgard EV |
|---|---|---|---|---|
| 0 | 0 | 0 | 0 | 0 |
| 5 | 3.275 | 3.325 | 3.39 | 3.355 |
| 10 | 7.285 | 7.56 | 7.795 | 7.66 |
| 15 | 10.65 | 12.52 | 13.005 | 12.55 |
| 20 | 11.89 | 18.24 | 18.725 | 15.28 |
| 25 | 13.12 | 24.245 | 24.43 | 18.27 |
| 30 | 14.13 | 30.29 | 30.13 | 21.145 |
| 35 | 15 | 36.365 | 35.77 | 23.99 |
| 40 | 15.78 | 42.425 | 41.53 | 26.71 |
| 45 | 16.485 | 48.445 | 47.015 | 29.375 |

TABLE 17

| Time | Blank | Product A | Sokalan PM10 | Belgard EV |
|---|---|---|---|---|
| 0 | 0 | 0 | 0 | 0 |
| 5 | 4.81 | 4.65 | 4.58 | 4.28 |
| 10 | 10.79 | 10.68 | 10.44 | 9.57 |
| 15 | 17.21 | 17.98 | 17.32 | 15.53 |
| 20 | 20.79 | 26.57 | 24.94 | 21.3 |
| 25 | 23.37 | 34.82 | 32.66 | 25.42 |
| 30 | 25.95 | 43.08 | 39.92 | 29.82 |
| 35 | 28.37 | 51.13 | 46.89 | 34.31 |
| 40 | 30.32 | 58.97 | 53.5 | 38.95 |
| 45 | 32.08 | 66.56 | 59.71 | 42.81 |

TABLE 18

| Time | Blank | Product A 1 ppm | Component 1 0.66 ppm | Component 2 0.33 ppm |
|---|---|---|---|---|
| 0 | 0 | 0 | 0.05 | 0.01 |
| 5 | 3.16 | 3.115 | 3.18 | 3.26 |
| 10 | 6.94 | 7.175 | 6.99 | 7.32 |
| 15 | 10.18 | 12.025 | 10.52 | 11.71 |
| 20 | 12.62 | 17.365 | 13.26 | 15.99 |
| 25 | 14.35 | 22.16 | 15.36 | 19.8 |
| 30 | 15.77 | 26.365 | 17.17 | 23.35 |
| 35 | 17 | 30.02 | 18.55 | 26.63 |

TABLE 18-continued

| Time | Blank | Product A 1 ppm | Component 1 0.66 ppm | Component 2 0.33 ppm |
|---|---|---|---|---|
| 40 | 18.05 | 33.225 | 19.27 | 29.72 |
| 45 | 19.03 | 36.13 | 19.88 | 32.67 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of inhibiting formation and deposition of scale in a thermal desalination process, the method comprising adding to a saline aqueous source of the thermal desalination process a composition comprising (i) an acrylic acid 2-acrylamido-2-methylpropyl sulfonic acid copolymer, wherein said copolymer optionally comprises a fluorescent moiety and (ii) an oligomeric phosphosuccinic acid produced from reacting fumaric acid and hypophosphite in the presence of an initiator, wherein the thermal desalination process produces a water temperature of from about 80° C. to about 160° C., wherein said copolymer and said oligomeric phosphosuccinic acid are present in the composition at a copolymer-to-oligomeric phosphosuccinic acid weight ratio of about 1:2.

2. The method of claim 1, wherein the oligomeric phosphosuccinic acid is a phosphinosuccinic acid oligomer having a formula $[R_X—(POOM)-R1_Y]$, wherein R and R1 independently are H, [CH(COOM)], or [CH(COOM)-CH(COOM)], X and Y are either 0 or a small whole number, the sum of X and Y being greater than 2, and M is selected independently at each occurrence from the group consisting of: H, Na, K, $NH_4$, and combinations thereof.

3. The method of claim 1, wherein the oligomeric phosphinosuccinic acid comprises less than about 22 mole percent monosodium phosphinicobis-succinic acid; less than about 26 mole percent monosodium phosphinico-succinic acid; less than about 12 mole percent sodium phosphosuccinic acid; less than about 5 mole percent sodium phosphate; less than about 6 mole percent sodium hypophosphite; and greater than about 32 mole percent phosphinosuccinic acid oligomer having a formula $[R_X—(POOM)-R1_Y]$, wherein R and R1 independently are H, [CH(COOM)], or [CH(COOM)-CH(COOM)], X and Y are either 0 or a small whole number, the sum of X and Y being greater than 2, and M is selected independently at each occurrence from the group consisting of: H, Na, K, $NH_4$.

4. The method of claim 1, wherein the oligomeric phosphosuccinic acid comprises: (a) phosphinosuccinic acid oligomer having formula $[R_X—(POOM)-R1_Y]$, wherein R and R1 independently are H, [CH(COOM)], or [CH(COOM)-CH(COOM)], X and Y are either 0 or a small whole number, the sum of X and Y being greater than 2, and M is selected independently at each occurrence from the group consisting of: H, Na, K, and $NH_4$; (b) about 36 mole percent to about 49 mole percent bis phosphinosuccinic acid adducts and about 26 mole percent to about 35 mole percent oligomeric phosphinosuccinic acid adducts; and (c) about 22 mole percent monosodium phosphinicobis-succinic acid, less than about 26 mole percent monosodium phosphinico-succinic acid, less than about 12 mole percent sodium phosphosuccinic acid, less than about 5 mole percent sodium phosphate, less than about 6 mole percent sodium phosphate, less than about 6 mole percent sodium hypophosphite, and greater than about 32 mole percent phosphinosuccinic acid oligomer having the formula $[R_X—(POOM)-R1_Y]$.

5. The method of claim 1, wherein the composition comprises about 40 weight percent maleic anhydride reaction products.

6. The method of claim 1, wherein the composition comprises mono, bis, and oligomeric phosphinosuccinic acid adducts.

7. The method of claim 6, wherein the composition comprises mono, bis, and oligomeric phosphinosuccinic acid adducts selected from the group consisting of: about 20 mole percent to about 85 mole percent bis phosphinosuccinic acid adduct; and about 36 mole percent to about 49 mole percent bis phosphinosuccinic acid adducts and about 26 mole percent to about 35 mole percent oligomeric phosphinosuccinic acid adducts.

8. The method of claim 1, wherein the composition is added to the saline aqueous source in an amount sufficient to provide a concentration of from about 0.01 ppm to about 10,000 ppm, based on the saline aqueous source.

9. The method of claim 1, wherein the composition is added to the saline aqueous source sufficient to provide a concentration of from about 0.1 ppm to about 10 ppm, based on the saline aqueous source.

10. The method of claim 1, wherein the saline aqueous source comprises at least one of: calcium, phosphate, magnesium, sulfate, bicarbonate, silicate, carbonate, iron, and combinations thereof.

11. The method of claim 1, wherein the saline aqueous source is capable of forming and depositing scale comprising at least one of: calcium sulfate, calcium carbonate, magnesium hydroxide, magnesium carbonate, and combinations thereof.

12. The method of claim 1, wherein the saline aqueous source comprises seawater.

13. The method of claim 1, further comprising adding the composition to a recirculation brine of the thermal desalination process.

14. The method of claim 1, further comprising adding to the saline aqueous source an additional scale inhibitor as part of said composition, separately, sequentially, or simultaneously, the additional scale inhibitor selected from the group consisting of: a polyacrylate, a polycarboxylate, polymaleic acid, and combinations thereof.

15. The method of claim 1, further comprising adding to the saline aqueous source a component selected from the group consisting of: a corrosion inhibitor; an additional scale inhibitor; a fluorescent tracer; a water treatment polymer; a pH-controlling chemical; and combinations thereof, either as part of the composition or added separately, sequentially, or simultaneously with the composition.

* * * * *